May 28, 1935.  E. C. LEIBIG  2,002,900
DECORATED GLASS ARTICLE
Filed Jan. 6, 1933

INVENTOR.
EDWARD C. LEIBIG
BY Dorsey & Cole
ATTORNEYS.

Patented May 28, 1935

2,002,900

UNITED STATES PATENT OFFICE 2,002,900

DECORATED GLASS ARTICLE

Edward C. Leibig, Corning, N. Y., assignor to Corning Glass Works, Corning, N. Y., a corporation of New York Application January 6, 1933, Serial No. 650,456

1 Claim. (Cl. 41—18)

This invention relates to labels and designs for glass bottles and vessels and has for its object the production of a label or design which will be permanent and not susceptible to the attack of the various fumes and chemical solutions to which it may be subjected in laboratories.

Labels and designs for bottles and other glass vessels have been made by the use of various enamels and glazes of special composition applied with a stencil and baked on but such labels and designs are not sufficiently resistant to withstand permanently the corrosive action of the chemicals and atmospheric conditions of the average chemical laboratory or of cleansing agents such as soaps. Such labels often craze or peel when subjected to temporary changes particularly after they have been used for some time and have become weathered or corroded. Moreover, it has been impossible to prepare enamels or glazes having a sufficiently low expansion coefficient to permit their successful use on reagent bottles of low expansion chemically resistant glass. Hence prior labelled reagent bottles have been composed of glass having a relatively low chemical stability and an expansion coefficient sufficiently high to match that of the enamel.

I propose to make the label an integral part of the bottle instead of a superficial film or layer of a composition different therefrom. As a result the label will not only be equal in chemical stability to the bottle itself but will have no tendency to craze or peel off. Although I may apply my label to practically all bottles of any composition whatsoever, I prefer to employ bottles made of highly resistant glass such as the glass B₂ of the Sullivan and Taylor Patent No. 1,304,623 thereby attaining maximum resistance both in the bottle and its label.

My invention is illustrated by the accompanying drawing, in which.

Figure 1:
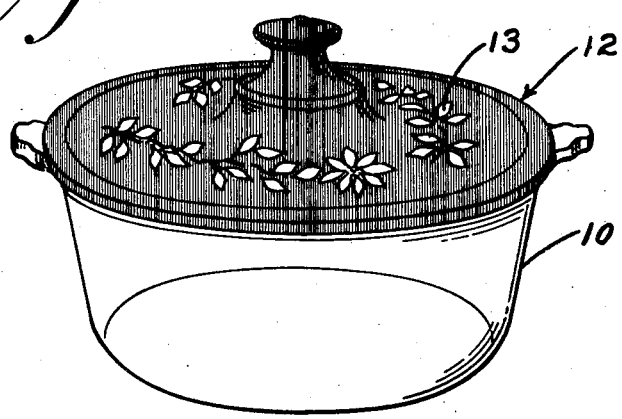
Fig. 1 is a perspective view of a baking dish and cover of thermally and chemically resistant glass decorated in accordance with my invention.

In the drawing, a glass article such as a baking dish 10 or a reagent bottle 11 has a stained area designated generally 12. A portion of the area 12 is cut away to form a design which may be in intaglio as for example at 13 in Fig. 1 or which may be in relief as at 14 in Fig. 2.

In practising my invention I color a predetermined area of the surface of the bottle or vessel where the label or design is to appear by means of a staining preparation containing preferably silver sulfide and copper sulfide. Although many staining compositions are suitable, I prefer to use a mixture of 180 grams of silver sulfide, 540 grams of yellow ochre and 160 grams of copper sulfide which I grind together in a ball mill with sufficient water to make a sprayable slip. I then heat the bottle or vessel to about 150° C. and spray the slip on to that portion which is to be colored. In doing this I prefer to use a shield of thin sheet metal having a cut-out portion of the shape desired for the total area to be covered by the label or design such as square, round, oval, etc. The staining slip or compound should dry on as rapidly as it is applied. The bottle or vessel is then heated to about 675° C. for about 45 minutes to cause the stain to act on the glass and color a very thin layer of the surface thereof. The article is then annealed in the usual manner after which the residual staining compound is wiped off with steel wool leaving the area beneath colored a deep reddish brown.

To the colored area I then apply a water soluble sandblast resist in the form and pattern of the finished label and by means of a sandblast I cut away the portion of the colored area which is not protected. The resist which may consist of any of the well known compositions is preferably applied to a sheet of tissue paper through a stencil of lead foil cut in the desired design. This paper bearing the resist is then applied to the bottle or vessel over the colored area and the colored area is exposed to a sandblast until the stained or colored layer of glass has been removed from the unprotected portion. The sandblast resist is then washed off with water and the design or label remains in relief on a matte background.

Figure 2:
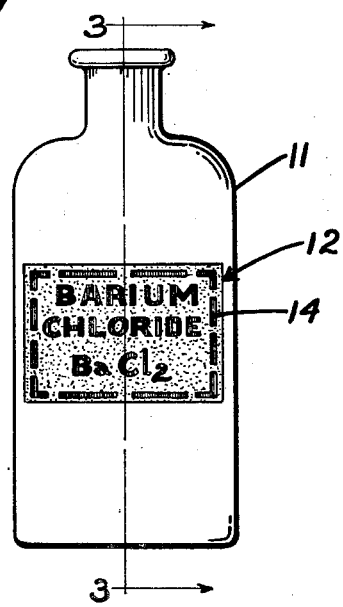
Fig. 2 is a front elevation of a reagent bottle of thermally and chemically resistant glass having a label in accordance with my invention.
Figure 3:
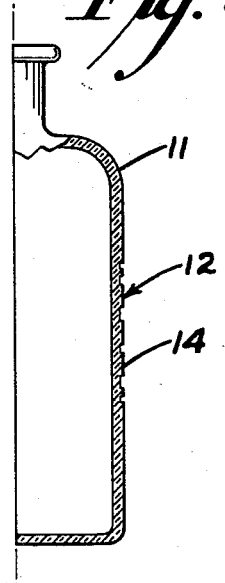
Fig. 3 is a vertical section taken on the line 3—3 of Fig. 2.

When it is desired to form a design in intaglio as in Fig. 1 the colored area may be cut away by means of a cutting wheel in the manner known in the art of engraving glass.

It will be obvious that the design may also be cut by the use of an etching acid and that other modifications of the method may be employed without departing from the spirit and scope of the invention as claimed.

I claim:

A vessel of thermally and chemically resistant glass having a design which is composed of a colored area and an uncolored area, one area being raised with respect to the other area, the colored area consisting of a thin surface layer of the glass which contains a small amount of an element of the copper sub-group having an atomic weight between 63 and 108 of the first periodic group, said colored layer having an expansion coefficient not higher than the uncolored portion of the glass.

EDWARD C. LEIBIG.